(12) United States Patent
Yeh (10) Patent No.: US 11,857,113 B1
(45) Date of Patent: Jan. 2, 2024

(54) COFFEE BEAN GRINDER (71) Applicant: CHUANG-KANG MACHINERY TECHNOLOGY CO., LTD., New Taipei (TW)

(72) Inventor: Hsiang-Chen Yeh, New Taipei (TW)

(73) Assignee: Chuang-Kang Machinery Technology Co., Ltd., New Taipei (TW)

( * ) Notice: Subject to any disclaimer, the term of this patent is extended or adjusted under 35 U.S.C. 154(b) by 8 days.

(21) Appl. No.: 17/898,064

(22) Filed: Aug. 29, 2022

(30) Foreign Application Priority Data

Jul. 13, 2022 (TW) .................................. 111126356

(51) Int. Cl.
| A47J 42/38 | (2006.01) |
| A47J 42/04 | (2006.01) |
| A47J 42/10 | (2006.01) |
| A47J 42/18 | (2006.01) |

(52) U.S. Cl.
CPC ............... *A47J 42/38* (2013.01); *A47J 42/04* (2013.01); *A47J 42/10* (2013.01); *A47J 42/18* (2013.01)

(58) Field of Classification Search
CPC .. A47J 42/38; A47J 42/04; A47J 42/10; A47J 42/46
See application file for complete search history.

(56) References Cited

U.S. PATENT DOCUMENTS

| 5,626,299 A * | 5/1997 | Haynes | A47J 42/40 241/169.1 |
| 2002/0145065 A1* | 10/2002 | McCowin | A47J 42/10 241/169.1 |
| 2011/0162538 A1* | 7/2011 | Wu | A47J 42/04 241/169.1 |
| 2018/0279829 A1* | 10/2018 | Kanazawa | A47J 42/46 |
| 2021/0059473 A1* | 3/2021 | Zernhelt | A47J 42/04 |
| 2022/0007893 A1* | 1/2022 | Weimer | A47J 42/04 |

FOREIGN PATENT DOCUMENTS

| CN | 212037251 U | 12/2020 |
| CN | 213345378 U | 6/2021 |
| CN | 214284612 U | 9/2021 |
| DE | 202019107282 U1 * | 3/2020 |
| EP | 2044872 A1 | 4/2009 |

OTHER PUBLICATIONS

English translate (DE202019107282U1), retrieved date Oct. 18, 2023.*
Substantive Examination Report mailed to Saudi Arabian Corresponding Patent Application No. 122440841 dated Sep. 1, 2023 and English Translation.
Office Action mailed to Corresponding European Patent Application No. 22193940.8-1016 dated Aug. 14, 2023.

* cited by examiner

*Primary Examiner* — Matthew Katcoff
*Assistant Examiner* — Mohammed S. Alawadi
(74) *Attorney, Agent, or Firm* — Rosenberg, Klein & Lee (57) ABSTRACT

A coffee bean grinder is provided, comprising a housing assembly, a shaft component, and a securing member. The shaft component is assembled in the housing assembly. When a coffee bean grinding complex is formed by an inner grinding member of the shaft component and an outer grinding member of the housing assembly, the shaft component and the housing assembly can be easily assembled and secured through the structural configuration of the securing member, and also through which, the shaft component and the housing assembly can also be disassembled for cleaning and maintenance after grinding operation.

13 Claims, 9 Drawing Sheets

COFFEE BEAN GRINDER

This application claims priority of Application No. 111126356 filed in Taiwan on 13 Jul. 2022 under 35 U.S.C. § 119; the entire contents of all of which are hereby incorporated by reference.

BACKGROUND

Technical Field

The present disclosure relates to the technical field of coffee bean grinding, particularly to a coffee bean grinder.

Related Art

In conventional coffee bean grinders, some of the coffee powder of coffee beans would remain in the device after grounding. This would cause the various freshly ground coffee powder to mix with previous residuals, allowing an undesirable taste and odor, with more likely a significant issue of lethal aflatoxin formation due to residual coffee powder accumulated for too long, once they are mixed with the freshly ground ones, the brewed coffee would have trace amounts of toxins that can cause health problems. Since conventional coffee bean grinders are mostly difficult to be disassembled and re-assembled, coffee powder residue in grinders would be hard to completely removed at any time after grinding, which is not convenient for daily cleaning and maintenance.

SUMMARY

The embodiments of the present disclosure provide a coffee bean grinder tended to solve the problem that conventional coffee bean grinders are not easy-disassemble and re-assemble for cleaning and maintenance The present disclosure provides a coffee bean grinder, comprising a housing assembly, a shaft component, and a securing member. The housing assembly comprises a housing, a bearing component, and an outer grinding member. The bearing component is disposed in the housing. The outer grinding member is assembled in the housing. The outer grinding member is disposed below the bearing component. The shaft component is assembled in the housing. The shaft component comprises a shaft member, an inner grinding member, and an elastic member. One end of the shaft member comprises a connecting shaft and a shaft cap. The shaft cap is disposed at the connecting shaft. An outer diameter of a bottom end of the shaft cap is greater than an outer diameter of the connecting shaft. The inner grinding member is disposed at the other end of the shaft member. One end of the shaft member passes through the elastic member and the bearing component in order. The elastic member is disposed between the inner grinding member and the bearing component, and two ends of the elastic member support the inner grinding member and the bearing component respectively. The inner grinding member and the outer grinding member are correspondingly disposed, and a grinding gap exists between the inner grinding member and the outer grinding member. The shaft member drives the inner grinding member to rotate relative to the outer grinding member for performing grinding through the cooperation of the inner grinding member and the outer grinding member. The securing member comprises a body, a securing hole, and a securing groove. The shape of an opening of the securing hole and the shape of an opening of the securing groove are identical to the shape of a periphery of the bottom end of the shaft cap. The securing groove is disposed at the body. The securing hole penetrates the body in correspondence with a position of the securing groove. An opening angular position of the securing groove on a surface of the body is different from an opening angular position of the securing hole on the surface of the body. Wherein, when assembling, the shaft cap passes through the securing hole of the securing member correspondingly, where the securing member presses against the bearing component and the elastic member downwardly; when assembled, the elastic member supports the bearing component and the securing member upwardly, the bottom end of the shaft cap is embedded in the securing groove of the securing member, and the securing member is secured between the shaft cap and the bearing component.

In one embodiment, the bearing component comprises a bearing part, a first ball bearing, and a second ball bearing. A bottom of the bearing part comprises a lower bearing groove. A top of the bearing part comprises an upper bearing groove. The bearing part comprises a shaft hole interconnecting the lower bearing groove and the upper bearing groove. The first ball bearing is disposed in the lower bearing groove. The second ball bearing is disposed in the upper bearing groove. The shaft member passes through the first ball bearing, the bearing part, and the second ball bearing.

In one embodiment, the shaft component further comprises a collar sleeved on the shaft member. The collar is disposed between the elastic member and a bottom of the bearing component.

In one embodiment, the bottom end of the shaft cap is provided with a shoulder. The shape of the opening of the securing hole, the shape of the opening of the securing groove, and the shape of a periphery of the shoulder of the shaft cap are polygonal, for example hexagon, pentagon, quadrilateral, or triangle.

In one embodiment, the coffee bean grinder further comprises an adjusting component, which comprises an adjusting member, a plurality of driving rods, and a rotating ring. A bottom of the adjusting member is screwed into the upper bearing groove. The adjusting member supports the securing member. A periphery of a top of the adjusting member comprises a toothed ring. The rotating ring is rotatably disposed on the housing assembly. The plurality of driving rods are disposed at the rotating ring. The plurality of driving rods are respectively engaged with the toothed ring. Wherein, the rotating ring drives the plurality of driving rods to rotate. The plurality of driving rods are linked with the toothed ring to drive the adjusting member to rotate upward or downward relative to the upper bearing groove.

In one embodiment, the coffee bean grinder further comprises a third ball bearing. The adjusting member comprises a recess in which the third ball bearing is disposed. The securing member is disposed on the third ball bearing.

In one embodiment, an outer side of a top of the housing assembly comprises a plurality of bumps. An inner side of the rotating ring comprises a plurality of notches. The plurality of bumps correspond to the plurality of notches. The plurality of bumps are disposed on rotating paths of the plurality of notches.

In one embodiment, the coffee bean grinder further comprises a handling component comprising a pivoting member, a handling rod, and a handling knob. The pivoting member is disposed at one end of the handling rod. The handling knob is disposed at the other end of the handling rod. The pivoting member is assembled to the shaft cap.

In one embodiment, the shaft cap comprises a slot. The pivoting member is embedded in the shaft cap. The shaft cap and the pivoting member are magnetic members. The shaft cap and the pivoting member are magnetically mutually attracted.

In one embodiment, an accommodating space exists between the housing and the bearing component. The accommodating space is in communication with the grinding gap.

In one embodiment, the coffee bean grinder further comprises a covering component, which comprises a support and a cover. The support is assembled to the shaft cap. The cover is assembled to the support. The cover covers and is disposed above the accommodating space.

In one embodiment, an inclined grinding surface of the inner grinding member comprises the grinding gap relative to an annular grinding surface of the outer grinding member. The inclined grinding surface of the inner grinding member comprises a first grinding surface and a second grinding surface. The first grinding surface is disposed above the second grinding surface. A grinding pattern on the second grinding surface has a greater pattern density than a grinding pattern on the first grinding surface.

In one embodiment, the coffee bean grinder further comprises a motor mechanism connected to the shaft member.

The embodiments of the present disclosure provide a coffee bean grinder, comprising a housing assembly, a shaft component, and a securing member, where the shaft component is assembled in the housing assembly. When a coffee bean grinding complex is formed by the inner grinding member of the shaft component and the outer grinding member of the housing assembly, the shaft component and the housing assembly can be easily assembled and secured through the structural configuration of the securing member, and also through which, the shaft component and the housing assembly can also be disassembled for cleaning and maintenance after grinding operation.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments are believed to be novel, and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
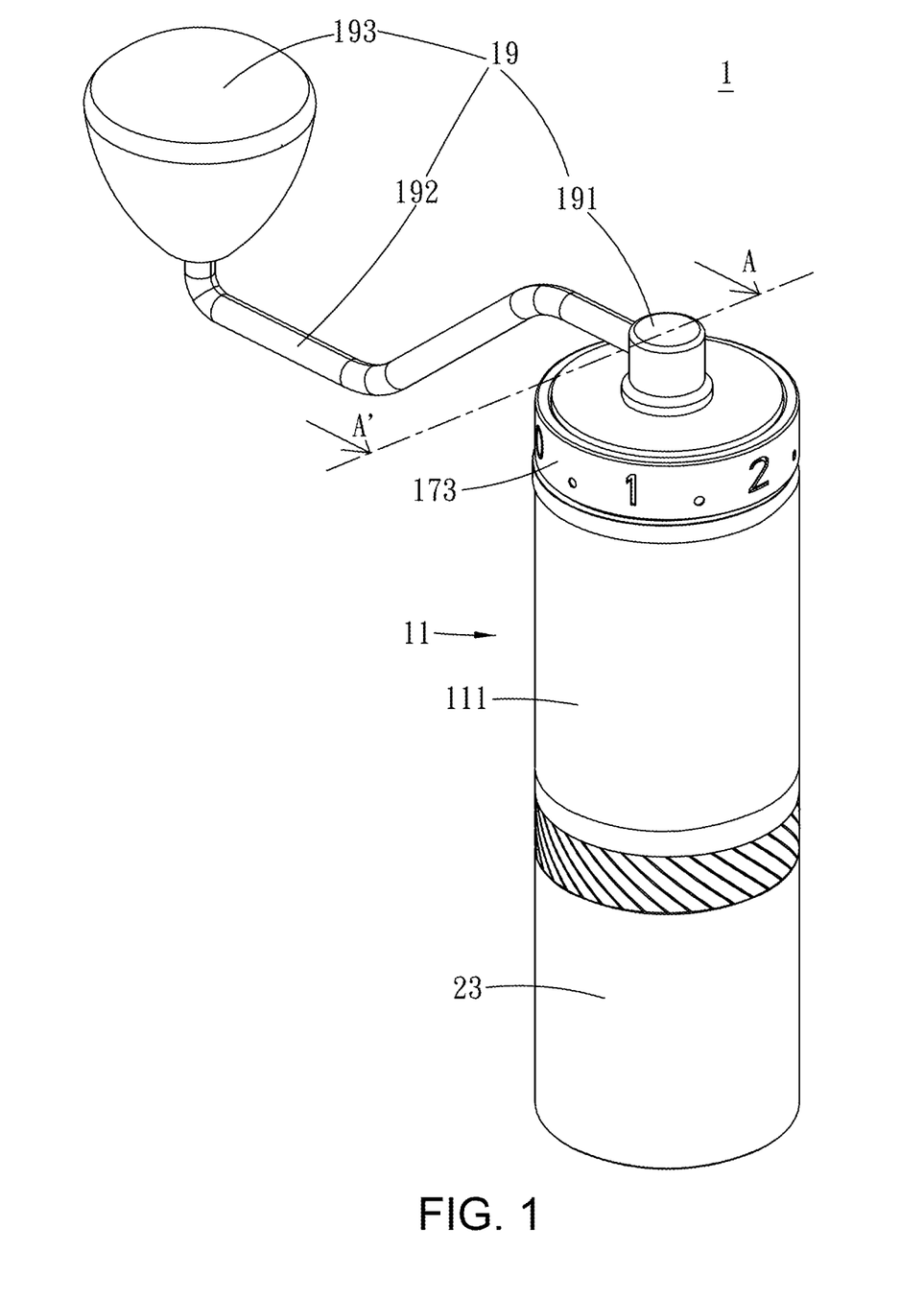
FIG. 1 is a perspective view of a coffee bean grinder of the present disclosure.
Figure 2:
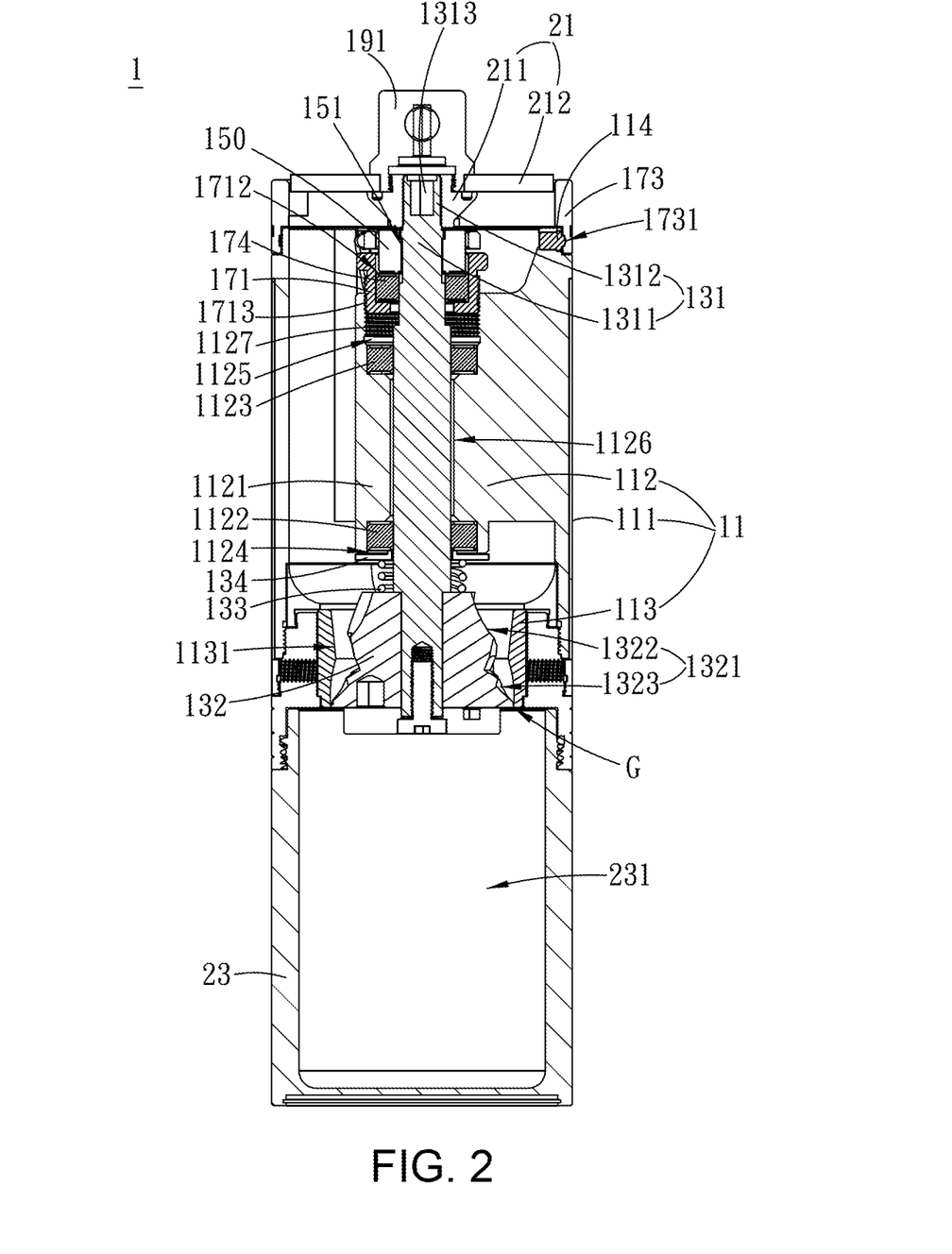
FIG. 2 is a cross-sectional view along line A-A of FIG. 1.
Figure 3:
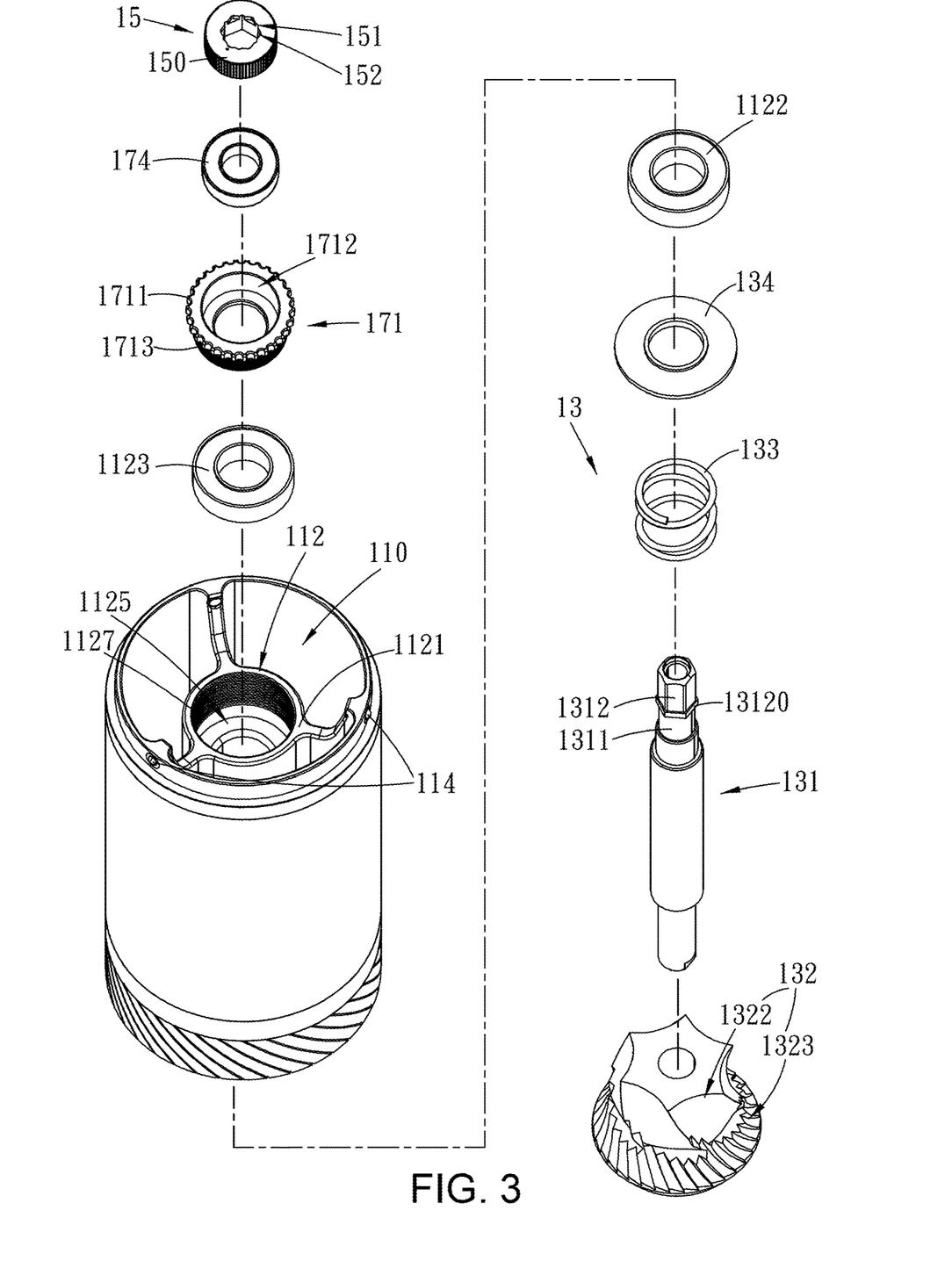
FIG. 3 is a schematic exploded view of a part of the coffee bean grinder of the present disclosure.

FIG. 1 is a perspective view of a coffee bean grinder of the present disclosure. FIG. 2 is a cross-sectional view along line A-A' of FIG. 1. FIG. 3 is a schematic exploded view of a part of the coffee bean grinder of the present disclosure. As shown in the figures, in this embodiment, a coffee bean grinder 1 is provided, which comprises a housing assembly 11, a shaft component 13, and a securing member 15. The housing assembly 11 comprises a housing 111, a bearing component 112, and an outer grinding member 113, where the bearing component 112 and the outer grinding member 113 are disposed in the housing 111, and the outer grinding member 113 is disposed below the bearing component 112. The shaft component 13 is assembled in the housing 111 and comprises a shaft member 131, an inner grinding member 132, and an elastic member 133. One end of the shaft member 131 comprises a connecting shaft 1311 and a shaft cap 1312. The shaft cap 1312 is disposed at the connecting shaft 1311. An outer diameter of a bottom end of the shaft cap 1312 is greater than an outer diameter of the connecting shaft 1311. The inner grinding member 132 is disposed at the other end of the shaft member 131. One end of the shaft member 131 passes through the elastic member 133 and the bearing component 112 in order. The elastic member 133 is disposed between the inner grinding member 132 and the bearing component 112, and two ends of the elastic member 133 support the inner grinding member 132 and the bearing component 112, respectively. The inner grinding member 132 and the outer grinding member 113 are correspondingly disposed, and a grinding gap G exists between the inner grinding member 132 and the outer grinding member 113.

The shaft member 131 drives the inner grinding member 132 to rotate relative to the outer grinding member 113. The coffee beans are ground by the cooperating operation of the inner grinding member 132 and the outer grinding member 113. When the coffee beans are ground, the coffee powder is discharged through the grinding gap G.

An accommodating space 110 exists between the housing 111 and the bearing component 112, and the accommodating space 110 is in communication with the grinding gap G. A inclined grinding surface 1321 of the inner grinding member 132 is opposite to an annular grinding surface 1131 of the outer grinding member 113 with a grinding gap G therebetween. The inclined grinding surface 1321 of the inner grinding member 132 comprises a first grinding surface 1322 and a second grinding surface 1323. The first grinding surface 1322 is disposed above the second grinding surface 1323. A grinding pattern of the second grinding surface 1323 has a greater pattern density than a grinding pattern of the first grinding surface 1322. So, when the coffee beans are put into the accommodating space 110, they would be roughly ground by the first grinding surface 1322 of the inclined grinding surface 1321 and the annular grinding surface 1131 at first, then would be further finely ground by the second grinding surface 1323 of the inclined grinding surface 1321 and the annular grinding surface 1131.

Figure 4:
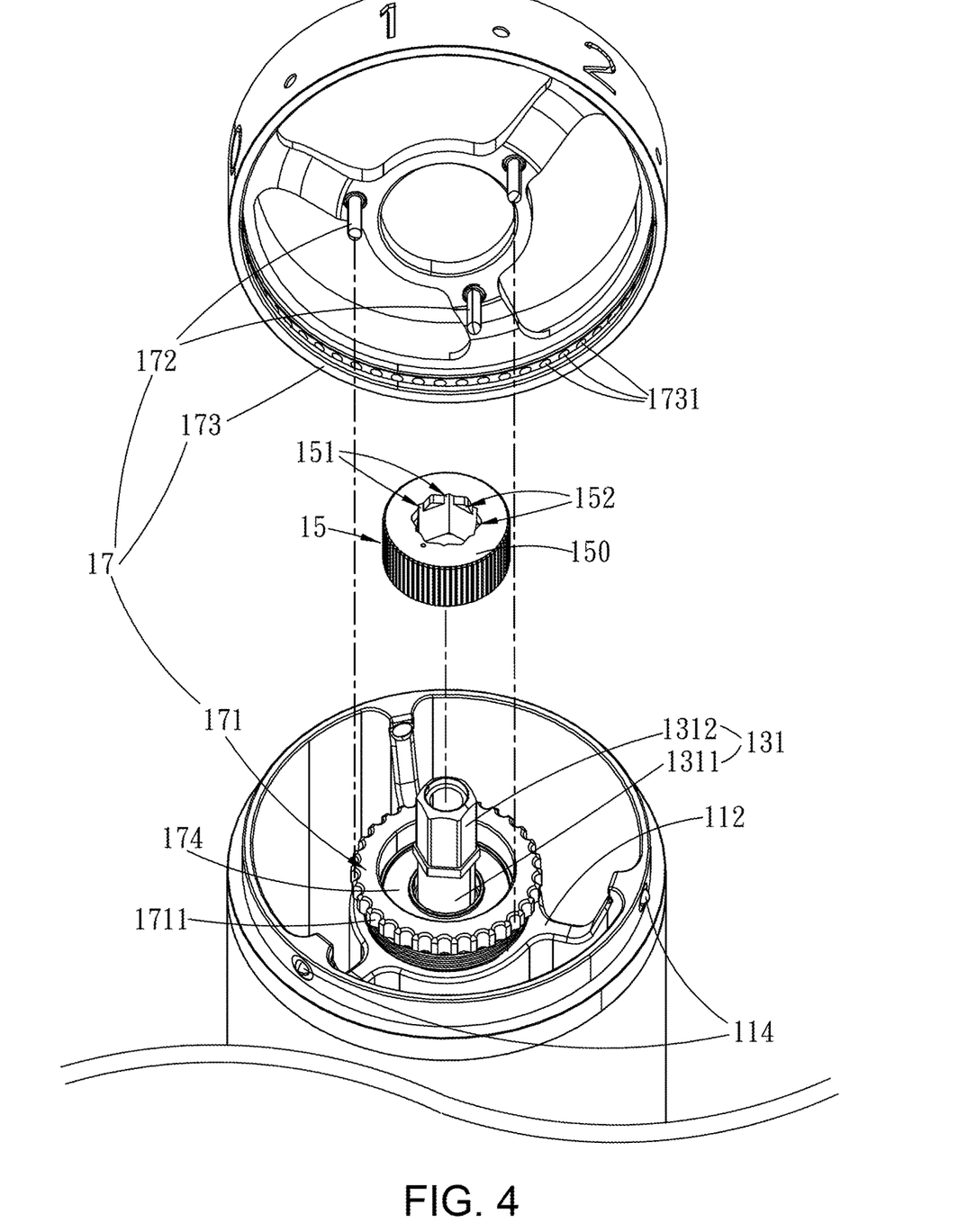
FIG. 4 is another schematic exploded view of a part of the coffee bean grinder of the present disclosure.

FIG. 4 is another schematic exploded view of a part of the coffee bean grinder of the present disclosure. As shown in the figure, in this embodiment, the securing member 15 comprises a body 150, a securing hole 151, and a securing groove 152. An opening shape of the securing hole 151 and an opening shape of the securing groove 152 are identical to the shape of a shoulder 13120 provided at the bottom end of the shaft cap 1312. The securing groove 152 is disposed at the body 150. The securing hole 151 penetrates the body 150 corresponding to a position of the securing groove 152. An opening angular position of the securing groove 152 on a surface of the body 150 is different from an opening angular position of the securing hole 151 on a surface of the body 150. Wherein the shape of the opening of the securing hole 151, the shape of the opening of the securing groove 152, and the shape of a periphery of the shoulder 13120 of the shaft cap 1312 are polygonal, for example, hexagon, pentagon, quadrilateral, or triangle, but it should not be limited thereto, where the above-mentioned shapes can be selected and adjusted according to requirements.

The shape of components in this embodiment is hexagonal as an example. The opening of the securing groove 152 and the opening of the securing hole 151 are hexagonal. The securing groove 152 and the securing hole 151 are overlapped and disposed on the securing member 15. The opening angular position of the securing groove 152 is different from the opening angular position of the securing hole 151, that is, the opening of the securing groove 152 is co-center with the opening of the securing hole 151, but one of the two hexagonal openings is deflected form another. In other words, the securing groove 152 and the securing hole 151 overlap at the center part. When the securing grooving 152 is deflected from the securing hole 151 at same axial center position, corners of the opening of the securing groove 152 and corners of the securing hole would be misaligned and do not overlap, i.e., the corners of the opening of the securing groove 152 correspond to an outer side of an edge of the opening of the securing hole 151, and the corners of the opening of the securing hole 151 correspond to an outside of a side edge of the opening of the securing groove 152. Moreover, when the securing hole 151 penetrates the securing member 15 and a bottom of the securing groove 152 and when the securing hole 151 penetrates a part of the bottom of the securing groove 152, an area of the securing groove 152 that is not penetrated by the securing hole 151 (i.e., the corners of the opening of the securing groove 152) would still comprise the bottom of the securing groove 152 as the shoulder 13120 for supporting the shaft cap 1312.

Figure 5:
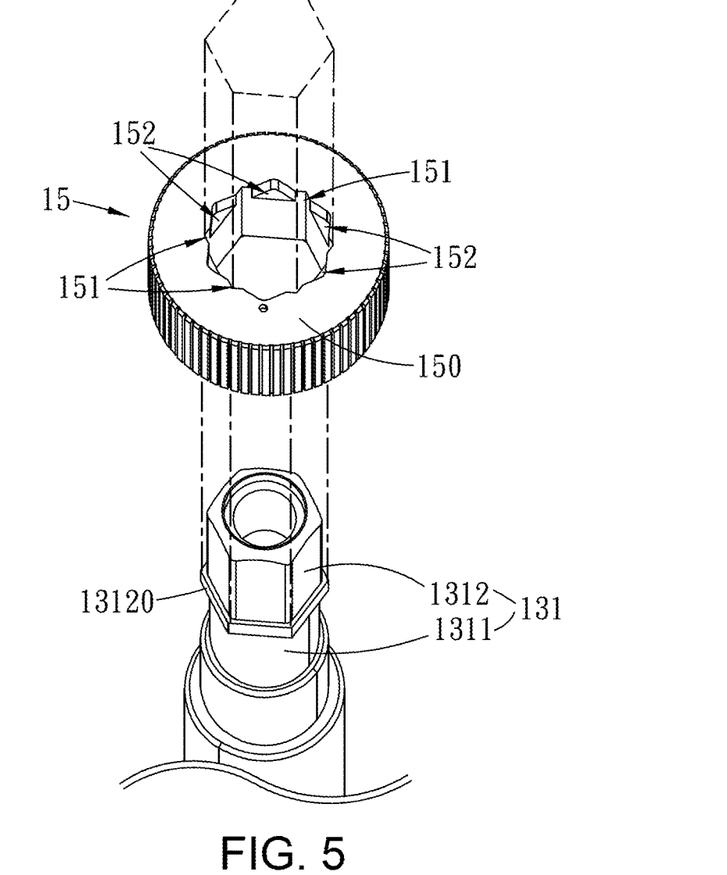
FIG. 5 depicts a first step of a securing action of a securing member secured to a shaft member of the present disclosure.

FIG. 5 depicts a first step of a securing action of a securing member secured to a shaft member of the present disclosure. As shown in the figure, in this embodiment, during assembling, the securing hole 151 of the securing member 15 corresponds to the shape of the periphery of the shoulder 13120 of the shaft cap 1312, so that the connecting shaft 1311 of the shaft member 131 and the shaft cap 1312 could pass through the securing hole 151 of the securing member 15. Wherein the dotted lines in FIG. 5 show a schematic range of the opening area of the securing hole 151, and also indicate an area where the shaft cap 1312 and the connecting shaft 1311 passing upward through the securing hole 151 of the securing member 15.

Figure 6:
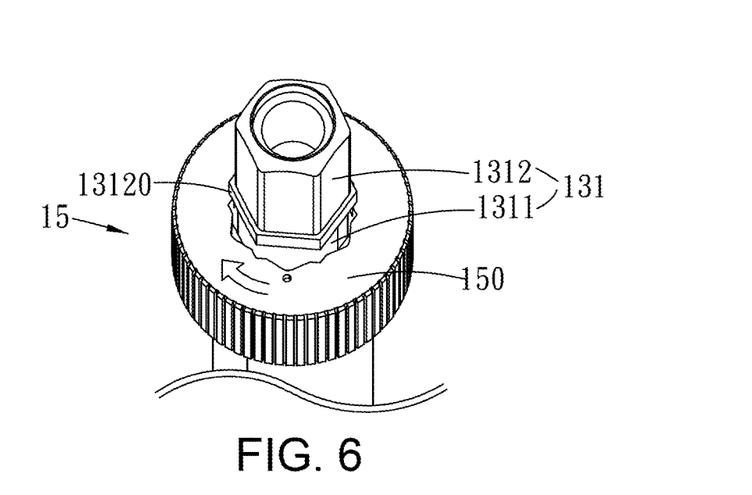
FIG. 6 depicts a second step of the securing action of the securing member secured to the shaft member of the present disclosure.

FIG. 6 depicts a second step of the securing action of the securing member secured to the shaft member of the present disclosure. As shown in the figure, in this embodiment, when the connecting shaft 1311 and the shaft cap 1312 pass through the securing hole 151 of the securing member 15 correspondingly, the securing member 15 would press downward against the bearing component 112 of the housing assembly 11 (see FIG. 2), so that the bearing component 112 of the housing assembly 11 could press downward against the elastic member 133, and the height of the shoulder 13120 of the shaft cap 1312 is disposed above the opening of the securing hole 151 of the securing member 15, that is, the connecting shaft 1311 is disposed in the securing hole 151 of the securing member 15.

Figure 7:
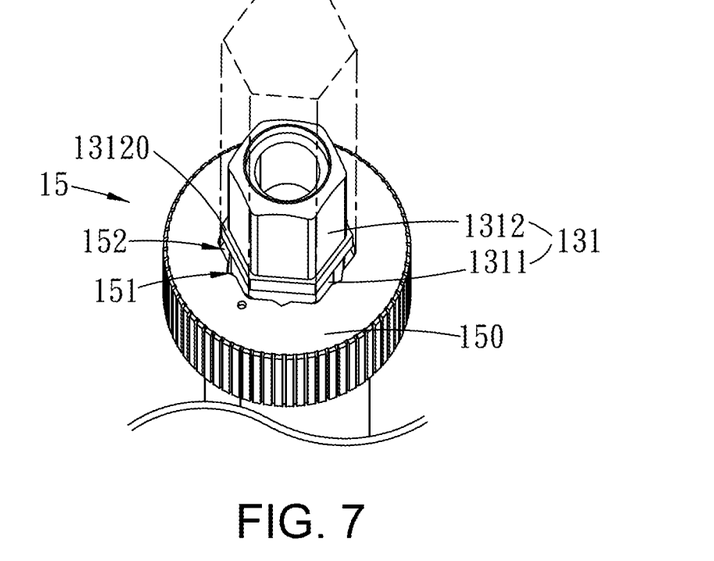
FIG. 7 depicts a third step of the securing action of the securing member secured to the shaft member of the present disclosure.

FIG. 7 depicts a third step of the securing action of the securing member secured to the shaft member of the present disclosure. As shown in the figure, in this embodiment, a diameter of the securing hole 151 of the securing member 15 is greater than an outer diameter of the connecting shaft 1311, so the securing member 15 can be rotated from an angle at which the opening of the securing hole 151 corresponding to the shoulder 13120 of the shaft cap 1312 to an angle at which the opening of the securing groove 152 corresponding to the shoulder 13120 of the shaft cap 1312. That is, the corners of the shoulder 13120 of the shaft cap 1312 could correspond to positions above the corners of the securing grooves 152 having the bottom. Wherein the dotted lines shown in FIG. 7 draw a schematic rame of the opening area of the securing groove 152.

Figure 8:
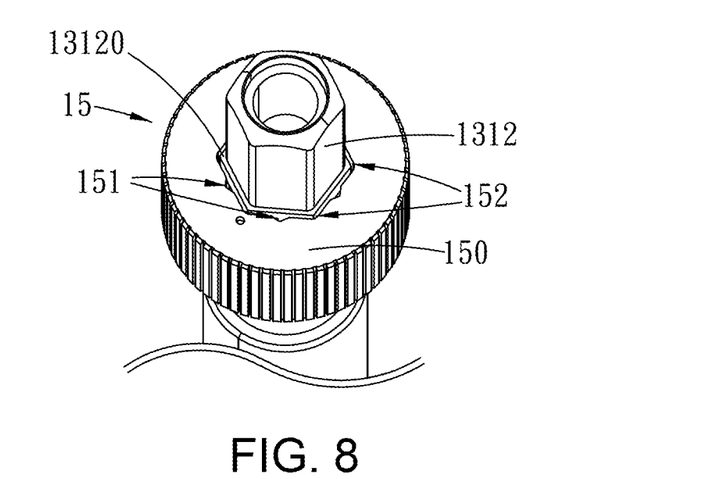
FIG. 8 depicts a fourth step of the securing action of the securing member secured to the shaft member of the present disclosure.

FIG. 8 depicts a fourth step of the securing action of the securing member secured to the shaft member of the present disclosure. As shown in the figure, in this embodiment, when assembled, an external force of the securing member 15 pushing down the bearing component 112 of the housing assembly 11 can be released, so that the elastic member 133 would be no longer under pressure. The elastic member 133 then restores the elastic force to upwardly support the bearing component 112 of the housing assembly 11, so that the bearing component 112 could upwardly support the securing member 15, the shoulder 13120 of the shaft cap 1312 could be embedded in the securing groove 152, and the bottom of the securing groove 152 could support the corners of the shoulder 13120. In this way, the securing member could be secured between the shaft cap 1312 and the bearing component 112.

Back to FIG. 3, the bearing component 112 comprises a bearing part 1121, a first ball bearing 1122, and a second ball bearing 1123. A bottom of the bearing part 1121 comprises a lower bearing groove 1124, and a top of the bearing part 1121 comprises an upper bearing groove 1125. The bearing part 1121 comprises a shaft hole 1126 interconnected with the lower bearing groove 1124 and the upper bearing groove 1125. The first ball bearing 1122 is disposed in the lower bearing groove 1124, and the second ball bearing 1123 is disposed in the upper bearing groove 1125. The shaft member 131 penetrates the first ball bearing 1122, the shaft bearing part 1121, and the second ball bearing 1123. The first ball bearing 1122 and the second ball bearing 1123 are secured to the shaft member 131. So, a rotational friction force of the shaft member 131 relative to the bearing part 1121 of the bearing component 112 can be reduced. Besides, the shaft component 13 further comprises a collar 134 that is sleeved on the shaft member 131. The collar 134 is disposed between the elastic member 133 and the bottom of the bearing component 112. The collar 134 could improve the supporting stability for one end of the elastic member 133.

Figure 9:
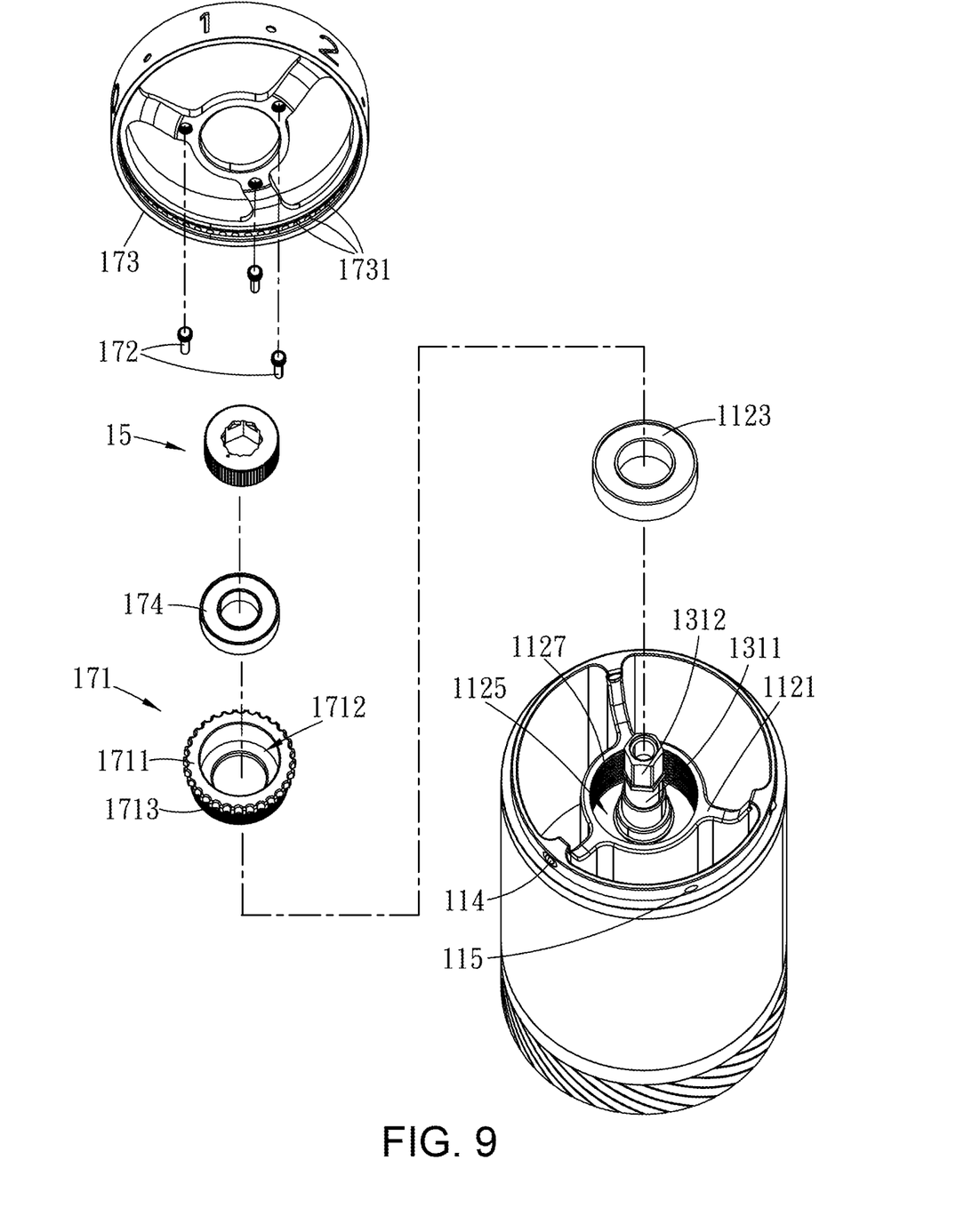
FIG. 9 is yet another schematic exploded view of a part of the coffee bean grinder of the present disclosure.

FIG. 9 is yet another schematic exploded view of a part of the coffee bean grinder of the present disclosure. As shown in the figure, in this embodiment, an adjusting component 17 is further provided, which comprises an adjusting member 171, a plurality of driving rods 172, and a rotating ring 173. An outer side of a bottom of the adjusting member 171 comprises an external thread 1713, and an inner side of the upper bearing groove 1125 comprises an internal thread 1127. The external thread 1713 at the bottom of the adjusting member 171 can be screwed with the internal thread 1127 inside the upper bearing groove 1125. The adjusting member 171 supports the securing member 15 from below, a periphery of a top of the adjusting member 171 comprises a toothed ring 1711, the rotating ring 173 is rotatably disposed on the housing assembly 11, the plurality of driving rods 172 are disposed at the rotating ring 173, and the driving rods 172 are respectively engaged with the toothed ring 1711. Wherein the rotating ring 173 drives the driving rods 172 to rotate, and the driving rods 172 are linked with the toothed ring 1711 to drive the adjusting member 171 to rotate to rise or descend relative to the upper bearing groove 1125.

Referring to FIG. 2 again, when the adjusting member 171 rotates and rises, it would support the securing member 15 to lift upward, and meanwhile, the securing member 15 would pull the shaft member 131 upwardly, the inner grinding member 132 of the shaft member 131 would compress the elastic member 133 along a direction towards the bearing component 112, and the inclined grinding surface 1321 of the inner grinding member 132 of the shaft member 131 would move close to the annular grinding surface 1131 of the outer grinding member 113 of the housing assembly 11 to reduce the grinding gap G. In this way, when the particle size of ground coffee powder is smaller than the grinding gap G, the coffee powder would fall out from the grinding gap G, so the particle of the ground coffee powder can be controlled in a limited size. Wherein, FIG. 2 shows that when the adjusting member 171 rotates and rises to the highest position, the bottom of the inclined grinding surface 1321 of the inner grinding member 132 of the shaft member 131 would abut against the bottom of the annular grinding surface 1131 of the outer grinding member 113 of the housing assembly 11, so the grinding gap G would be closed.

When the adjusting member 171 rotates and descends, it would support the securing member 15 to move downward, the securing member 15 would no longer act on the shaft member 131, and meanwhile, the inner grinding member 132 of the shaft member 131 would no longer compress the elastic member 133 in a direction toward the bearing component 112. In other words, the elastic restoring force of the elastic member 133 can push the inner grinding member 132 downwardly and drives the shaft member 131 to move downward, and the inclined grinding surface 1321 of the inner grinding member 132 would be separated from the annular grinding surface 1131 of the outer grinding member 113 of the housing assembly 11 to increase the grinding gap G. In this way, the ground coffee bean powder would be coarse particles.

Besides, the adjusting component 17 further comprises a third ball bearing 174, the adjusting member 171 comprises a recess 1712, the third ball bearing 174 is disposed in the recess 1712, and the securing member 15 is disposed on the third ball bearing 174. The third ball bearing 174 also penetrates the shaft member 131. So, the third ball bearing 174 can be used to reduce the rotational friction force between the securing member 15 and the adjusting member 171. Furthermore, an outer side of a top of the housing assembly 11 comprises a plurality of bumps 114, and an inner side of the rotating ring 173 comprises a plurality of notches 1731. The bumps 114 correspond to the notches 1731, and are disposed on rotation paths of the notches 1731 of the rotating ring 173. During the rotation of the rotating ring 173, the vibration and sound of the bumps 114 moving into or out of the notches 1731 can be clearly felt and heard. Wherein, an outer surface of the rotating ring 173 is labeled with numbers, so during rotation, the grinding gap G can be adjusted by adjusting the rotating distance by turning the numbers and scales labeled on the rotating ring 173.

Moreover, the outer side of the top of the housing assembly 11 is labeled with a zero mark 115 between the two bumps 114. By rotating the adjusting member 171 to the highest position, the inner grinding member 132 of the shaft member 131 can be raised to the highest position. When the grinding gap G is in a closed state, rotate the number or the zero point of the scale on the outer surface of the rotating ring 173 to the position corresponding to the zero mark 115 for assembling. In this way, users could see that the grinding gap G of the coffee bean grinder 1 is at the zero point of the closed state. Regarding the adjustment of the grinding gap G, it can be adjusted to a desired gap distance by turning the rotating ring 173 to a certain point of the scale in correspondence with the desired gap distance by taking the zero mark 115 as reference point.

Figure 10:
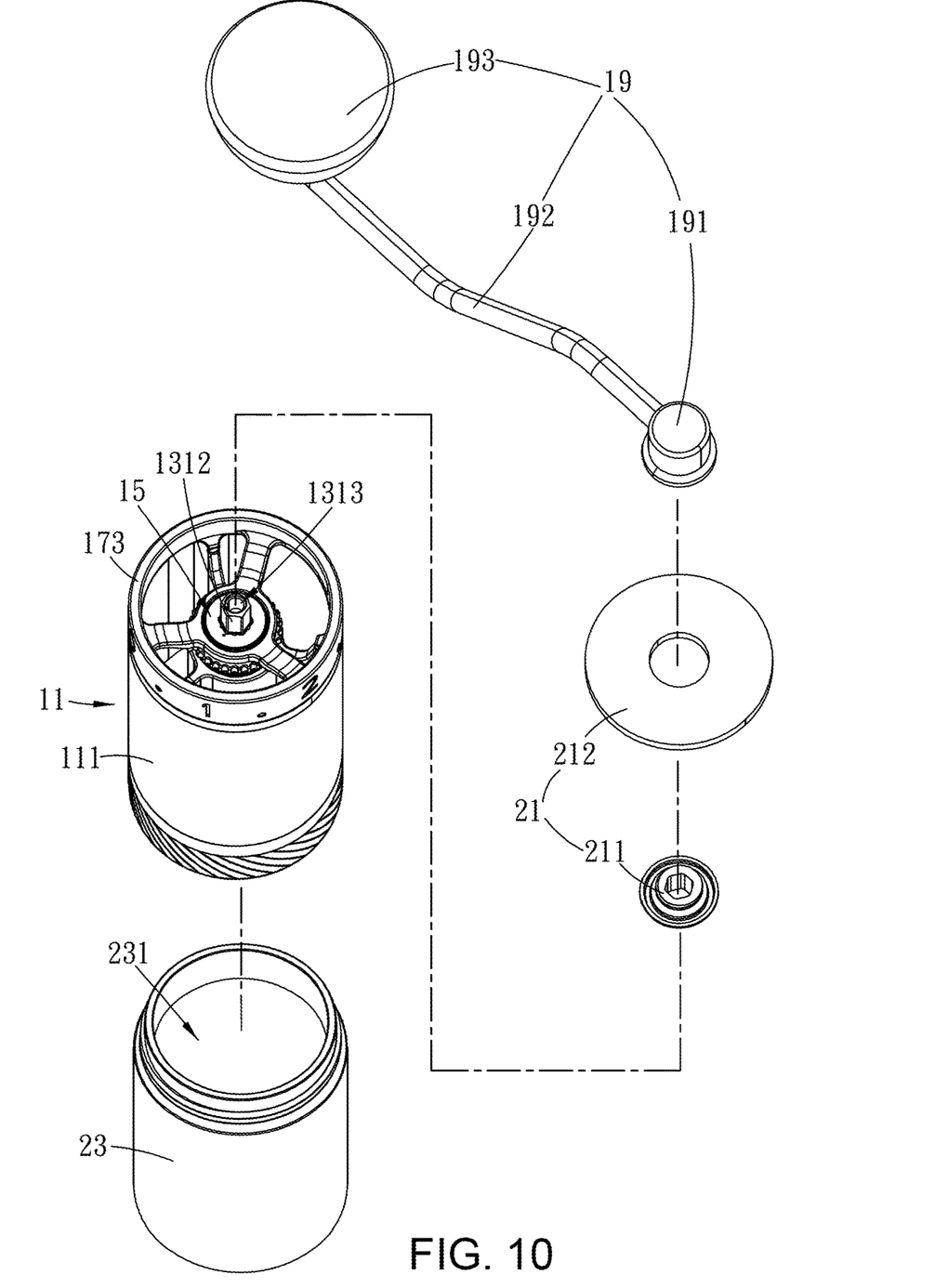
FIG. 10 is yet another schematic exploded view of a part of the coffee bean grinder of the present disclosure.

FIG. 10 is yet another schematic exploded view of a part of the coffee bean grinder of the present disclosure. As shown in the figure, in this embodiment, a handling component 19 is further provided. The handling component 19 comprises a pivoting member 191, a handling rod 192, and a handling knob 193. The pivoting member 191 is disposed at one end of the handling rod 192, the handling knob 193 is disposed at the other end of the handling rod 192, and the pivoting member 191 is assembled on the shaft cap 1312. Besides, the shaft cap 1312 comprises a slot 1313, the pivoting member 191 is embedded in the shaft cap 1312, and the shaft cap 1312 and the pivoting member 191 are magnetic members, which are mutually magnetically attracted for assembling and securing.

Besides, a covering component 21 is further provided, which comprises a support 211 and a cover 212. The support 211 is assembled on the shaft cap 1312, the cover 212 is assembled on the support 211, and the cover 212 covers and is disposed above of the accommodating space 110. In addition, an accommodating member 23 is further provided, comprises an accommodating groove 231 corresponding to an outlet of the grinding gap G, and the accommodating member 23 collects the ground coffee powder.

Figure 11:
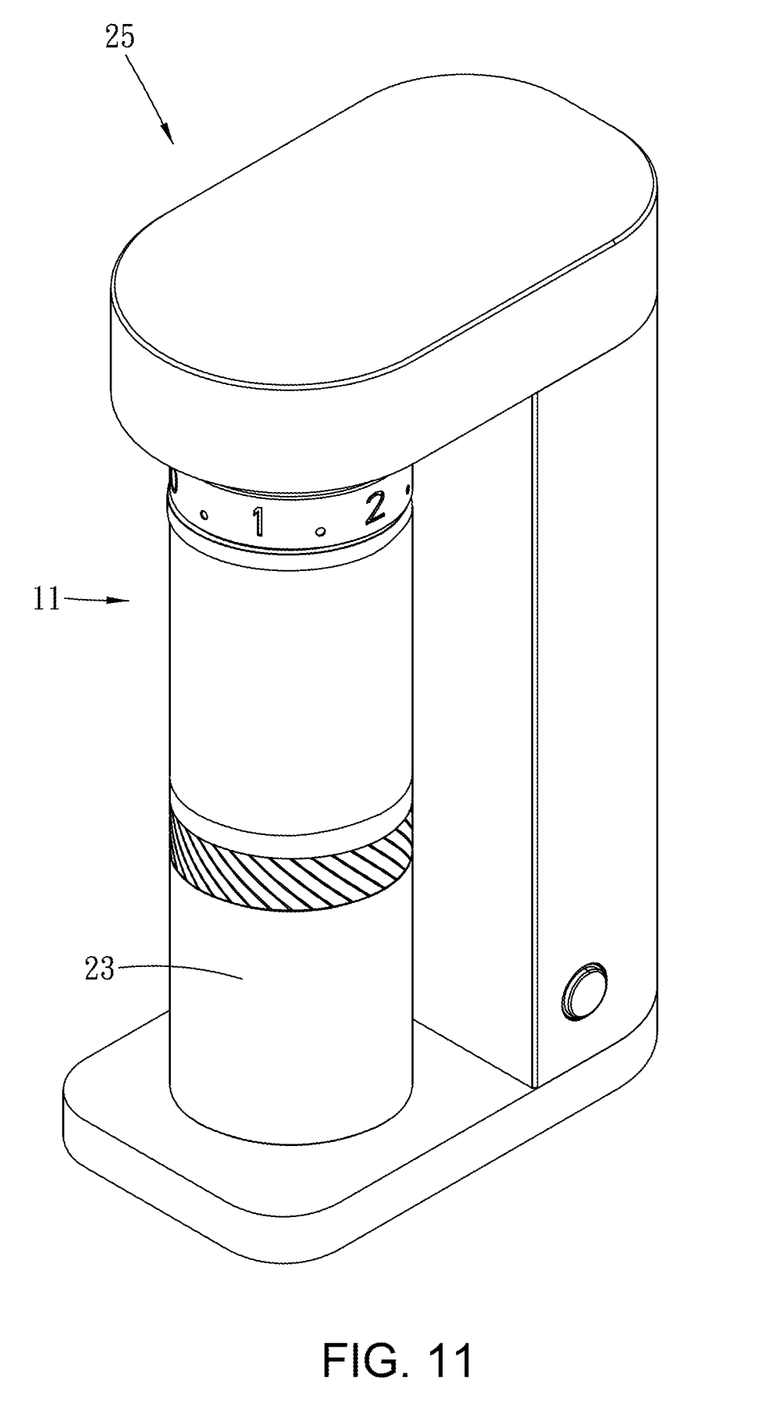
FIG. 11 is a perspective view showing a connecting condition of the coffee bean grinder to a motor mechanism of the present disclosure.

FIG. 11 is a perspective view showing a connecting condition of the coffee bean grinder to a motor mechanism of the present disclosure. As shown in the figure, in this embodiment, a motor mechanism 25 is further provided, which is connected to the shaft member 131 and can drive the shaft member 131 to rotate. The shaft member 131 drives the inner grinding member 132 to rotate relative to the outer grinding member 113 for motored coffee bean grinding, where the motor mechanism 25 can be a motor or any driving element. The motor mechanism 25 can be at least the base described in another Taiwanese patent (application number: 111203945) filed by the applicant of this disclosure, where the base is connected to a shaft member 131 through a drive shaft of the first assembling part, as long as the length and structural configuration of the drive shaft is in coordination with the overall shape and size of the coffee bean grinder of the present disclosure.

In summary, embodiments of the present disclosure provide a coffee bean grinder, comprising a housing assembly, a shaft component, and a securing member, where the shaft component is assembled in the housing assembly. When a coffee bean grinding complex is formed by the inner grinding member of the shaft component and the outer grinding member of the housing assembly, the shaft component and the housing assembly can be easily assembled and secured through the structural configuration of the securing member, and also through which, the shaft component and the housing assembly can also be disassembled for cleaning and maintenance after grinding operation.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A coffee bean grinder, comprising:
a housing assembly comprising a housing, a bearing component, and an outer grinding member, the bearing component being disposed in the housing, the outer grinding member being assembled in the housing, the outer grinding member being disposed below the bearing component;
a shaft component assembled in the housing, the shaft component comprising a shaft member, an inner grinding member, and an elastic member, one end of the shaft member comprising a connecting shaft and a shaft cap, the shaft cap being disposed at the connecting shaft, an outer diameter of a bottom end of the shaft cap being greater than an outer diameter of the connecting shaft, the inner grinding member being disposed at the other end of the shaft member, one end of the shaft member passing through the elastic member and the bearing component in order, the elastic member being disposed between the inner grinding member and the bearing component, two ends of the elastic member supporting the inner grinding member and the bearing component respectively, the inner grinding member and the outer grinding member being correspondingly disposed, a grinding gap existing between the inner grinding member and the outer grinding member, the shaft member driving the inner grinding member to rotate relative to the outer grinding member for performing grinding through the cooperation of the inner grinding member and the outer grinding member; and
a securing member comprising a body, a securing hole, and a securing groove, a shape of an opening of the securing hole and a shape of an opening of the securing groove being identical to a shape of a periphery of the bottom end of the shaft cap, the securing groove being disposed at the body, the securing hole penetrating the body in correspondence with a position of the securing groove, an opening angular position of the securing groove on a surface of the body being different from an opening angular position of the securing hole on the surface of the body;
wherein, when assembling, the shaft cap passes through the securing hole of the securing member correspondingly, where the securing member presses against the bearing component and the elastic member downwardly; when assembled, the elastic member supports the bearing component and the securing member upwardly, the bottom end of the shaft cap is embedded in the securing groove of the securing member, and the securing member is secured between the shaft cap and the bearing component.

2. The coffee bean grinder according to claim 1, wherein the bearing component comprises a bearing part, a first ball bearing, and a second ball bearing; a bottom of the bearing part comprises a lower bearing groove; a top of the bearing part comprises an upper bearing groove; the bearing part comprises a shaft hole interconnecting the lower bearing groove and the upper bearing groove; the first ball bearing is disposed in the lower bearing groove; the second ball bearing is disposed in the upper bearing groove; the shaft member passes through the first ball bearing, the bearing part, and the second ball bearing.

3. The coffee bean grinder according to claim 1, wherein the shaft component further comprises a collar sleeved on the shaft member; the collar is disposed between the elastic member and a bottom of the bearing component.

4. The coffee bean grinder according to claim 1, wherein the bottom end of the shaft cap is provided with a shoulder; the shape of the opening of the securing hole, the shape of the opening of the securing groove, and a shape of a periphery of the shoulder of the shaft cap are polygonal.

5. The coffee bean grinder according to claim 2 comprising an adjusting component comprising an adjusting member, a plurality of driving rods, and a rotating ring, a bottom of the adjusting member being screwed into the upper bearing groove, the adjusting member supporting the securing member, a periphery of a top of the adjusting member comprising a toothed ring, the rotating ring being rotatably disposed on the housing assembly, the plurality of driving rods being disposed at the rotating ring, the plurality of driving rods being respectively engaged with the toothed ring; wherein, the rotating ring drives the plurality of driving rods to rotate; the plurality of driving rods are linked with the toothed ring to drive the adjusting member to rotate upward or downward relative to the upper bearing groove.

6. The coffee bean grinder according to claim 5 comprising a third ball bearing, the adjusting member comprising a recess in which the third ball bearing being disposed, the securing member being disposed on the third ball bearing.

7. The coffee bean grinder according to claim 5, wherein an outer side of a top of the housing assembly comprises a plurality of bumps; an inner side of the rotating ring comprises a plurality of notches; the plurality of bumps correspond to the plurality of notches; the plurality of bumps are disposed on rotating paths of the plurality of notches.

8. The coffee bean grinder according to claim 1 comprising a handling component comprising a pivoting member, a handling rod, and a handling knob, the pivoting member being disposed at one end of the handling rod, the handling knob being disposed at the other end of the handling rod, the pivoting member being assembled to the shaft cap.

9. The coffee bean grinder according to claim 8, wherein the shaft cap comprises a slot; the pivoting member is embedded in the shaft cap; the shaft cap and the pivoting member are magnetic members; the shaft cap and the pivoting member are magnetically mutually attracted.

10. The coffee bean grinder according to claim 1, wherein an accommodating space exists between the housing and the bearing component: the accommodating space is in communication with the grinding gap.

11. The coffee bean grinder according to claim 10 comprising a covering component comprising a support and a cover, the support being assembled to the shaft cap, the cover being assembled to the support, the cover covering and being disposed above the accommodating space.

12. The coffee bean grinder according to claim 1, wherein an inclined grinding surface of the inner grinding member comprises the grinding gap relative to an annular grinding surface of the outer grinding member; the inclined grinding surface of the inner grinding member comprises a first grinding surface and a second grinding surface; the first grinding surface is disposed above the second grinding surface; a grinding pattern on the second grinding surface has a greater pattern density than a grinding pattern on the first grinding surface.

13. The coffee bean grinder according to claim 1 comprising a motor mechanism connected to the shaft member.

* * * * *